2,945,831

DISPERSIONS OF ORGANIC POLYMERS AND CHRYSOTILE ASBESTOS, PROCESS OF PREPARING FILM THEREFROM AND PRODUCT THEREOF

Evan Franklin Evans, West Chester, Pa., and Dale Edward Jackson, Newark, Del., assignors to E. I. du Pont de Nemours and Company, Wilmington, Del., a corporation of Delaware No Drawing. Filed June 13, 1956, Ser. No. 591,030

4 Claims. (Cl. 260—29.6)

This invention relates to non-coalescing dispersions of organic polymers and their use in the preparation of films, coatings and fibers.

The use of polymer dispersions, such as aqueous dispersions of polytetrafluoroethylene or polyacrylonitrile, which do not coalesce on removal of the dispersion medium, and require an additional coalescing or sintering step, in the preparation of films and coatings has been greatly hampered by the phenomena known collectively as "mud-cracking." It has been established that all films cast from non-coalescing polymer dispersions have a critical thickness beyond which no continuous film can be prepared in one application. Castings exceeding the critical thickness will develop cracks and fissures on drying and cannot be sintered into continuous films and coatings. Even though, at times, a continuous film may be obtained on drying, the dried film is of low strength, unable to support itself and generally cannot be sintered to give an impermeable, strong film. The critical thickness beyond which "mud-cracking" occurs will vary from polymer to polymer and even between dispersions of the same polymer. In general, however, the critical thickness is very low—in the range of 1 to 2.5 mils.

For many applications it is desirable to have a film thickness exceeding 2 mils. Under very closely controlled conditions, relatively thick crack-free films can be built up on a substrate by applying several consecutive thin coats of the polymer dispersions, each followed by a separate drying and sintering step. It is obvious, however, that this method is laborious, cumbersome and costly. Furthermore, it does not eliminate the need for extreme care in avoiding irregularities in the coating step which exceed the critical thickness and would lead to fissures on drying. Alternate methods of increasing the critical thickness include the addition of soluble polymers or other soluble ingredients. Such methods require large quantities of additives which may affect the polymer properties adversely or do not tend to increase the strength of the unsintered film or coating.

It is, therefore, one of the objectives of the present invention to increase the critical thickness of films deposited from dispersions of non-coalescing organic polymers.

It is another object to provide a process for preparing polymer films and polymer coatings.

Still another object is to prepare novel polymer dispersions having improved usefulness in the preparation of films and coatings.

A further object of the present invention is to prepare novel films and coatings having improved strength properties prior to coalescing.

Other objectives will become apparent hereinafter.

The objects of the present invention are accomplished by blending a colloidal dispersion of an organic, non-coalescing polymer with from 1 to 20% by weight of said polymer of colloidally dispersed chrysotile asbestos fibers, said fibers having an electrostatic charge of the same nature as said polymer and employing the resulting composition in the preparation of films and coatings. In the preferred embodiment of the present invention an aqueous dispersion of an organic polymer is blended with an aqueous dispersion of chrysotile asbestos fibers, the ratio of said polymer to said asbestos fiber being from 99:1 to 90:10 until a substantially homogeneous co-dispersion is obtained, applying said co-dispersion to a substrate, drying the so formed coating, and then coalescing either the film or the film on the substrate to obtain a strong film or coating.

It was discovered that the addition of small quantities of colloidally dispersed chrysotile asbestos fibers to dispersions of non-coalescing organic polymers greatly increases the critical thickness of films or coatings prepared from such polymer dispersions. This ability to increase critical thicknesses was found to be essentially unique with colloidally dispersed chrysotile fibers and is attributed to their chemical structure and the physical shape. The chemical structure of the chrysotile asbestos is believed to allow the uniform and stable dispersion of the chrysotile. This property was found to be critical in the process of the present invention. Thus, fibrous amphibole asbestos which could not be readily and uniformly dispersed was almost completely ineffective in increasing the critical thickness of dispersion cast films and coatings. The physical structure of chrysotile dispersions was found to be another critical factor. Thus, by decreasing the length of the chrysotile fiber through milling, it was found that the ability of the chrysotile fibers to improve the critical thickness of dispersion cast films and coatings was significantly decreased. However, it is quite feasible that other fibrous particles having a length-to-diameter ratio similar to that of chrysotile, if uniformly dispersed, may be employed to increase the critical thickness if cast from non-coalescing polymer dispersions. "Critical thickness," as used herein, is defined as the dry film thickness above which cracks develop in film deposited from one coat of polymer dispersion.

The process of the present invention is applicable to dispersions of organic, non-coalescing polymers in general. By non-coalescing polymer dispersions are meant polymer dispersions which contain the polymer suspended in a liquid medium in the form of discrete particles which, on removal of the liquid phase, require an additional coalescing or sintering step to obtain a uniformly bonded structure. Examples of such polymer dispersions are aqueous or non-aqueous dispersions of polytetrafluoroethylene, polyacrylonitrile, polyamides, polyvinylchloride, polyvinylidene chloride, polystyrene and others. Aqueous dispersions are preferably employed, although the use of non-aqueous polymer dispersions is not excluded. The process of the present invention is particularly useful with polymers which cannot be readily melt extruded into films, such as polytetrafluoroethylene. The concentration of the polymer dispersion is of minor significance and does not limit the applicability of the process of the present invention. The concentration of the polymer in the dispersion may thus be employed to control the thickness of the polymer film to be cast. In general, concentrations will vary from 5 to 75% by weight of the total dispersion. The polymer dispersions are prepared by various methods known in the prior art. Thus, aqueous dispersions of polytetrafluoroethylene are prepared by polymerizing tetrafluoroethylene in an aqueous medium in the presence of a dispersing agent and a water soluble peroxide catalyst, as disclosed in U.S. Patent 2,559,752, issued to Berry, March 6, 1951, and U.S. Patent 2,534,058, issued to Renfrew on December 6, 1950.

The chrysotile fiber dispersions employed in the present invention may be prepared by the processes disclosed in U.S. Patent 2,626,213, issued to I. J. Novak, January 20, 1953, and U.S. Patent 2,661,287, issued to G. D. Barbaras, December 1, 1953. They are generally prepared by dispersing chrysotile in an aqueous medium in the presence of a dispersing agent. Depending on the method of preparation, the dispersed chrysotile fibers are either positively charged as obtained by the method disclosed in U.S. Patent 2,661,287 or negatively charged as obtained by the method disclosed in U.S. Patent 2,626,213. The procedure described in U.S. Patent 2,661,287, employing fibrous chrysotile and aluminum salts as dispersing agents, may also be employed to prepare chrysotile asbestos fiber dispersions in non-aqueous media. Suitable dispersions of chrysotile asbestos fibers have from 2 to 10% solids concentration.

The quantity of dispersed chrysotile fibers necessary to achieve the desirable increase in critical thickness is small, but may be varied from 1 to 20% by weight of the polymer to which the chrysotile is added. In general, outstanding results are obtained when 2 to 3% of dispersed chrysotile fibers are added to the dispersed polymer. The optimum quantities to be employed vary with the polymer dispersion and the use to which the co-dispersion is to be put.

The polymer dispersions are blended with the chrysotile dispersion in the desired proportion with mild agitation until a uniform co-dispersion is obtained. The blending is preferably carried out at room temperature, since elevated temperatures may cause the coagulation of the co-dispersion. Preferably the medium of the polymer dispersion and of the chrysotile dispersion is the same, and generally is water. If different media are used, they must be compatible and, furthermore, not cause the coagulation of either the polymer or the chrysotile fibers. It is also necessary that the electrostatic charge on the polymer particles is of the same nature as the electrostatic charge on the fiber particles. Thus, the blending of positively charged polymer particles with negatively charged chrysotile fibers will cause the coagulation rather than the codispersion necessary for casting of films and coating of substrates. Aqueous polymer dispersions are generally negatively charged and thus the negatively charged chrysotile dispersion prepared by the process of the above-mentioned U.S. Patent 2,626,213 is employed to form the codispersions. Positively charged polymer dispersions are blended with the chrysotile dispersions disclosed in U.S. Patent 2,661,287. Whether the polymer dispersions and the chrysotile fiber dispersions are compatible or not may be readily determined by preliminary testing with small samples.

The resulting co-dispersion obtained on blending dispersed polymer with dispersed chrysotile asbestos fibers is highly suitable for the casting of films, coating of substrates and even for the spinning of fibers. Standard techniques employed for casting and spinning polymer dispersion may be employed in the casting and spinning of films and fibers of the co-dispersions of the present invention. Thus, a dispersion containing both polymer and chrysotile asbestos may be brushed on a clean metal substrate, then dried at temperatures and pressures sufficient to evaporate the water rapidly and thereafter heated to the sintering or coalescing temperature to obtain a crack-free, bonded coating. In the continuous preparation of films the codispersion is cast on a heated casting wheel, which causes the water to evaporate, then taken off the wheel and heated to the coalescing temperature. In the spinning of fibers the co-dispersion is spun into a coagulating bath and then passes through a coalescing bath.

The present invention is further illustrated by the following examples wherein all parts are by weight, and all aqueous dispersions negatively charged unless otherwise stated.

Example I

To 100 parts of an aqueous dispersion of polytetrafluoroethylene containing 60 parts of polymer and 3 parts of "Triton X-100," a commercially available octylphenyl polyglycol ether dispersing agent, described in U.S. 2,870,752, was added 100 parts of a chrysotile asbestos fiber dispersion containing 2 parts of the chrysotile asbestos fiber in dilute aqueous sodium sulfosuccinate. The resulting mixture was agitated until a uniform co-dispersion was obtained. The co-dispersion was then cast on a glass plate at room temperature, air dried until all the water had been removed, and then heated to a temperature of 350° C. for 30 minutes to sinter the polymer. A strong, continuous, cold-drawable film of polytetrafluorethylene was stripped off the glass plate. A film cast without the addition of the chrysotile asbestos fiber dispersion was extensively mud-cracked and could not be sintered into a continuous film.

Example II

To an aqueous dispersion of polytetrafluoroethylene having a solid content of 60% polytetrafluoroethylene was added with moderate agitation a 2% aqueous dispersion of chrysotile asbestos fibers, prepared according to U.S. Patent 2,626,213, until the ratio of the polytetrafluoroethylene to the chrysotile asbestos films was 94:6. The mixture was agitated until a uniform co-dispersion was obtained. The mixed dispersion was ejected onto a revolving greased casting drum, maintained at 100° C. The dried film was taken off the drum and passed through a silicone bath maintained at 350° C. The resulting coalesced film was found to have a thickness of 5–6 mils and was uniformly sintered and free of cracks and fissures. The unsintered film, as obtained from the casting drum, was sufficiently strong to support more than 4 feet of its own weight. The film was cut into strips which could be drawn 3.5× at room temperature. The drawn strips were found to have a tenacity of 0.51 gram per denier, an elongation of 51% and a modulus of 2.5 grams per denier. In the absence of the asbestos fiber dispersion, no continuous, crack-free film could be obtained.

Example III

To a 40% aqueous dispersion of polyacrylonitrile was added a 2% dispersion of chrysotile asbestos fiber, prepared as described in U.S. Patent 2,626,213 until the weight ratio of the polyacrylonitrile to the chrysotile asbestos fiber was 97:3. The dispersion of polyacrylonitrile was obtained by aqueous emulsion polymerization. The mixture was mildly agitated until a uniform co-dispersion was obtained. The co-dispersion was cast on a glass plate and dried. Crack-free coatings, having a thickness of 5–10 mils, were obtained. The coating was coalesced into a continuous film by immersion in 56% aqueous calcium thiocyanate at 90° C. In the absence of the chrysotile asbestos fiber extensive mud-cracking occurred on casting a film from the dispersion.

Example IV

To a 30% aqueous dispersion of polyvinylidene chloride prepared by aqueous emulsion polymerization was added a 2% aqueous dispersion of chrysotile asbestos fibers prepared as described in U.S. Patent 2,626,213, until the ratio of the polymer to the asbestos fiber was 97:3. The resulting mixture was stirred until an apparently uniform co-dispersion was obtained. This dispersion was cast on a glass plate and on drying resulted in a uniform, crack-free coating having a thickness of 5–10 mils. A coating prepared in the same way without the colloidally dispersed chrysotile fibers resulted in a heavily cracked discontinuous film.

Similar results were obtained with a 45% aqueous dispersion of polystyrene.

Example V

To a 10% dispersion of polyvinyl chloride in dimethyl formamide/methanol (50:50) was added a 2% dispersion of positively charged chrysotile asbestos fiber in a mixture of dimethyl formamide and methanol until a ratio of 75:25 of polymer to the asbestos fiber was obtained. The dispersion of polyvinyl chloride was prepared by agitation in the nonaqueous medium. The chrysotile asbestos fiber dispersion was prepared by adding 2 parts of dry chrysotile to 100 parts of a 50/50 mixture of dimethyl formamide and methanol containing 0.1 mol of basic aluminum formoacetate per gram of asbestos as the dispersing agent and agitating the resulting mixture until a stable dispersion was obtained. The co-dispersion of polymer and asbestos fiber was cast on a glass plate. On drying a 5–10 mil thick, continuous and crack-free film was obtained. Casting and drying of films from the polymer dispersion without the addition of the chrysotile dispersion resulted in greatly cracked, discontinuous films.

The above examples have illustrated how the critical thickness of coatings obtained from dispersions of non-coalescing organic polymers can be increased by the addition of dispersed chrysotile asbestos fibers. The co-dispersions of the present invention are usefully employed in the coating of substrates, the casting of films and the spinning of fibers. Improved coatings, films and fibers are obtained by the process of the present invention.

The co-dispersions of the present invention may be employed to coat solid substrates such as metallic surfaces or wood surfaces or they may be employed to coat porous substrates such as fabrics and ceramic surfaces. The coatings may be applied by techniques heretofore employed in the coating of substrates. It is quite feasible to employ primer coatings to improve the adhesion of the coating to the substrate. If so desired, more than one coating may be applied by the process of the present invention.

The casting of films and the spinning of fibers employing co-dispersions of polymer and chrysotile asbestos is accomplished by techniques used with the dispersions in the absence of the asbestos fibers. Films and fibers prepared from the co-dispersions have the advantage of greater strength in the uncoalesced state and thus may be employed in more rugged and rapid methods of production. Since the advantages resulting from the present invention are attained by the addition of only small quantities of the chrysotile asbestos fiber, the mechanical properties of films obtained by this process do not vary significantly from the properties of the unmodified polymer film. Chrysotile asbestos has outstanding electrical properties, high temperature stability and corrosion resistance and, therefore, will not detract from similar properties of the polymer as in the case of polymers of tetrafluoroethylene. It is, of course, possible to add additional fillers, pigments, dyes, stabilizing and other modifying agents to the co-dispersions of the present invention.

The process of the present invention is particularly useful with respect to the polymers which are not suitable for the preparation of films and fibers by melt fabrication, such as polytetrafluoroethylene.

It is apparent that many widely different embodiments of this invention can be made without departing from the spirit and scope thereof and, therefore, the invention is not intended to be limited, except as defined in the appended claims.

We claim:

1. A liquid coating composition consisting essentially of an aqueous medium containing from 5 to 60% of colloidally dispersed polytetrafluoroethylene based on the combined weight of the liquid medium and polymer and from 1 to 20% by weight of said colloidally dispersed polytetrafluoroethylene of a colloidally dispersed chrysotile asbestos fiber having an electronegative charge.

2. The process of preparing crackfree polytetrafluoroethylene films consisting essentially of blending an aqueous colloidal dispersion of polytetrafluoroethylene, said dispersion having a polymer content of 5 to 60% by weight of the dispersion with an aqueous colloidal dispersion of negatively charged chrysotile asbestos fiber until a ratio of polymer to chrysotile asbestos fiber of 99:1 to 80:20 is obtained, spreading the resulting blend in the form of a film on a substrate, drying the film formed to remove the dispersion medium and thereafter heating the film to above 327° C. to coalesce the film.

3. The product formed by the process of claim 2.

4. The process of preparing crackfree polytetrafluoroethylene coatings consisting essentially of blending an aqueous colloidal dispersion of polytetrafluoroethylene, said dispersion having a polymer content of 5 to 60% by weight of the dispersion, with an aqueous dispersion of negatively charged chrysotile asbestos fiber until a ratio of polymer to chrysotile asbestos of 99:1 to 80:20 is obtained, spreading the resulting blend on a substrate, heating the coating formed to remove the dispersion medium, and thereafter heating the substrate and coating to above 327° C. to coalesce the polymer.

References Cited in the file of this patent

UNITED STATES PATENTS

| | | |
|---|---|---|
| 2,196,579 | Reinhardt | Apr. 9, 1940 |
| 2,311,233 | Jaenicke | Feb. 16, 1943 |
| 2,562,117 | Osdal | July 24, 1951 |
| 2,661,287 | Barbaras | Dec. 1, 1953 |
| 2,769,713 | Wilson | Nov. 6, 1956 |

UNITED STATES PATENT OFFICE

CERTIFICATE OF CORRECTION

Patent No. 2,945,831                      July 19, 1960

Evan Franklin Evans et al.

It is hereby certified that error appears in the printed specification of the above numbered patent requiring correction and that the said Letters Patent should read as corrected below.

Column 1, line 43, for "dispersions" read -- dispersion --; column 4, line 27, for "films" read -- fibers --.

Signed and sealed this 27th day of December 1960.

(SEAL)
Attest:

KARL H. AXLINE
Attesting Officer

ROBERT C. WATSON
Commissioner of Patents